(12) United States Patent
Preston et al.

(10) Patent No.: US 8,421,358 B2
(45) Date of Patent: Apr. 16, 2013

(54) LAMP

(75) Inventors: Barry Preston, Melton Mowbray (GB); Edwin Charles O'Dell, Leicester (GB)

(73) Assignee: Ceravision Limited, Milton Keynes (GB)

(*) Notice: Subject to any disclaimer, the term of this patent is extended or adjusted under 35 U.S.C. 154(b) by 173 days.

(21) Appl. No.: 12/734,194

(22) PCT Filed: Oct. 17, 2008

(86) PCT No.: PCT/GB2008/003514
§ 371 (c)(1),
(2), (4) Date: Aug. 16, 2010

(87) PCT Pub. No.: WO2009/050473
PCT Pub. Date: Apr. 23, 2009

(65) Prior Publication Data
US 2011/0006681 A1    Jan. 13, 2011

(30) Foreign Application Priority Data
Oct. 19, 2007    (GB) .................................. 0720534.7

(51) Int. Cl.
*H01J 7/44*    (2006.01)
(52) U.S. Cl.
USPC ............................................. 315/39; 315/32
(58) Field of Classification Search .................. None
See application file for complete search history.

(56) References Cited

U.S. PATENT DOCUMENTS

| 4,810,933 | A | 3/1989 | Moisan | |
|---|---|---|---|---|
| 6,737,809 | B2 | 5/2004 | Espiau | |
| 2001/0035720 | A1 | 11/2001 | Guthrie | |
| 2002/0167282 | A1* | 11/2002 | Kirkpatrick et al. | 315/248 |
| 2007/0211991 | A1 | 9/2007 | Espiat | |

FOREIGN PATENT DOCUMENTS

| WO | WO03/094982 | 11/2003 |
|---|---|---|
| WO | WO2006/129102 | 12/2006 |
| WO | WO 2006129102 A2 * | 12/2006 |

OTHER PUBLICATIONS

Al-Shamma'a, A.I. et al., "Low Pressure Microwave Plamsa Ultraviolet Lamp for Water Purification and Ozone Applications", Journal of Physics D. Applied Physics, IOP Publishing.

Moisan, Michel et al., "Small Microwave Plasma Source for Long Column Production without Magnetic Field", IEEE Transactions on Plasma Science, vol. PS-3, No. 2 Jun. 1975.

* cited by examiner

*Primary Examiner* — Crystal L Hammond
(74) *Attorney, Agent, or Firm* — Bay State IP, LLC

(57) ABSTRACT

A discharge tube of glass, filled with a halogen/noble-gas mix, which passes through a ½ lambda wave guide of alumina at an aperture ¼ lambda from one end. The wave guide is silver plated to establish resonance between its opposed ends. An antenna/probe is provided in another aperture, driven via a matching circuit from an amplifier. The discharge tube has a length greater than twice the thickness of the wave guide, extending from the wave guide on at least one side thereof.

31 Claims, 3 Drawing Sheets

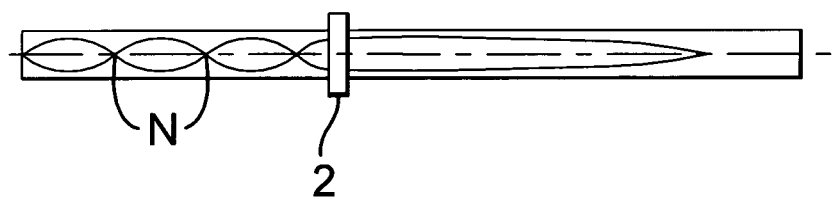
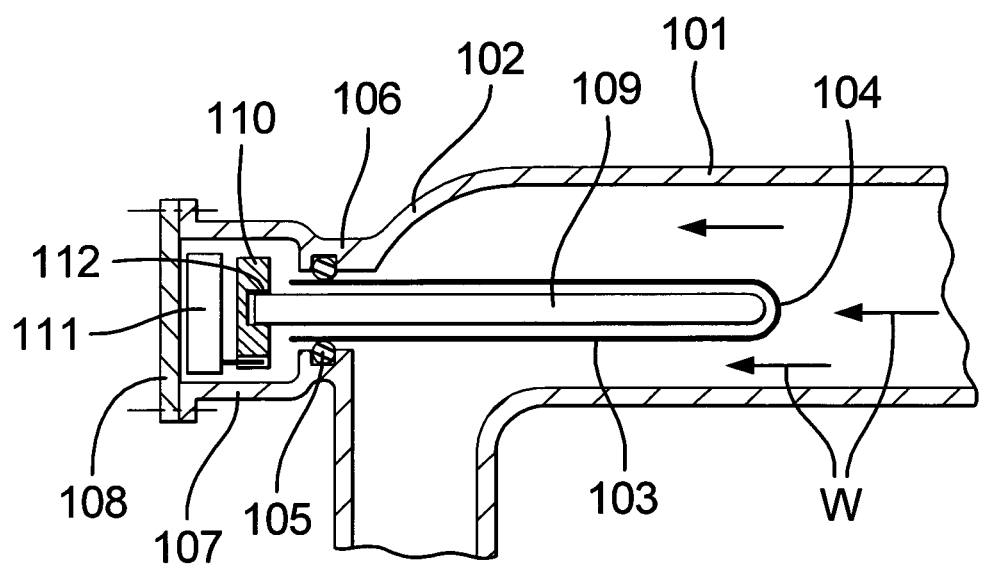
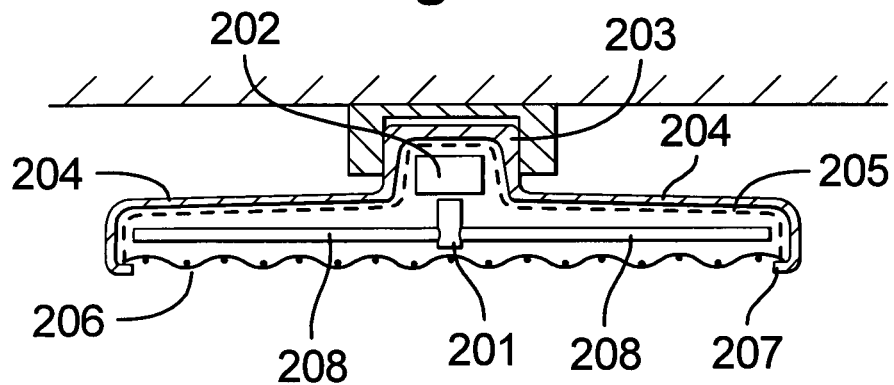

LAMP

CROSS REFERENCE TO RELATED APPLICATION

This application is for entry into the U.S. National Phase under §371 for International Application No. PCT/GB2008/003514 having an international filing date of Oct. 17, 2008, and from which priority is claimed under all applicable sections of Title 35 of the United States Code including, but not limited to, Sections 120, 363 and 365(c), and which in turn claims priority under 35 USC 119 to U.K. Patent Application No. 0720534.7 filed on Oct. 19, 2007.

BACKGROUND OF THE INVENTION

The present invention relates to a lamp.

DESCRIPTION OF THE RELATED ART

In our patent International application No WO2006/129102, we have disclosed a lamp having an electrodeless bulb, which is excited by a microwave wave guide. The bulb is short and contained within the depth of the wave guide.

In another patent application, as yet unpublished, we have disclosed a bulb that protrudes slightly from the wave guide. It does not protrude by the depth of the wave guide.

In U.S. Pat. No. 5,072,157, in the Thorn name, a launcher or surfatron is disclosed for exciting a plasma in a discharge tube. In the words of this patent, the surfatron "generates an oscillating electric field parallel to the longitudinal axis of the discharge body". This excites the plasma to emit ultraviolet radiation.

U.S. Pat. No. 4,810,933 describes an improved lamp of the surfatron and discharge tube type. It warns against surfatron arrangements which create standing waves in the discharge tube.

SUMMARY OF THE INVENTION

We have discovered that we can excite a plasma discharge in a discharge tube using a microwave guide of the type described in out patent. This is surprising, particularly in view of the electrical fields—albeit at microwave frequency—of a surface wave in the discharge being axial of the tube and the electric fields of the wave guide being orthogonal to the tube, with the wave guide being arranged with the tube passing through it.

According to the invention there is provided a lamp comprising:
  a microwave wave guide of solid dielectric material, the wave guide being a body having:
    thickness between two opposite sides,
    a discharge tube aperture extending into the body of the wave guide from one side and
    a transverse dimension between two opposite edges, which dimension is an integer and/or fractional multiple of a wavelength of microwave oscillation in the wave guide at a drive frequency between the edges, which edges are electrically grounded,
  a drive probe received in the wave guide for exciting the microwave oscillation and
  a discharge tube:
    having a length greater than twice the thickness of the wave guide,
    extending from the wave guide on at least one side thereof and into the aperture in the wave guide for coupling the microwave oscillation from the wave guide to the discharge tube and
    containing a material excitable by the microwave oscillation to produce a light emitting plasma in the discharge tube.

Normally, the thickness of the wave guide will be less than its transverse dimension.

The two opposite edges can be plane, parallel edges, as where the wave guide is cuboid or they can be oppositely and convexly curved as where the wave guide is round or elliptical.

Preferably, the solid dielectric material is chosen from the group comprising: alumina, quartz, plastics materials including polytetrafluoroethylene, barium tetratitinate and titanium oxide; and the discharge tube is of quartz, glass or polycrystalline alumina.

At this stage in the development of the lamp, we have tested a number of discharge tubes, mostly of the order of ten times the thickness of the wave guide. We expect discharge tubes as short as twice the wave guide thickness to operate. However such a short tube is likely to be on the limit of usefulness in that the light emitting discharge in these tubes involves collision of high energy electrons with cold gas molecules as opposed to collision with hot gas molecules in the case of the lamps of our patent application No WO2006/129102. The latter emit visible light from excitation of metal halide in noble gas carriers.

The discharge tubes of our present invention emit visible and/or ultraviolet (UV) light in accordance with their fills. Where the fills are of rare gases and/or free halogen gases and/or include mercury, they emit UV light. Such fills are well known as excimers. A lamp emitting UV light can find use where UV light is required as in water sterilisation, or the discharge tube can be coated with fluorescent material of producing visible light. Where the fills are of rare gas with metal halides, metal oxyhalides and metal hydrides, they emit visible light. Suitable compounds are the iodides, bromides and chlorides of titanium, tin, indium and thallium Niobium oxychloride and magnesium hydride are also suitable.

It should be noted that all halogen containing excimers and the above metal halides, metal oxyhalides and metal hydrides would be expected to attack the electrodes of discharge lamps having electrodes, which the discharge tubes of the lamps of the invention do not have.

Despite the teaching of U.S. Pat. No. 4,810,933, to avoid the formation of standing waves, in particular by use of non-coherent launchers, we have discovered that beneficial effects can be obtained by use of a discharge tube of a length to cause standing waves of radiation from the plasma discharge to be established.

Again we have surprisingly discovered that, by driving the lamp with the same frequency and different lengths of discharge tube, differing wavelengths of standing waves are excited in that the inter-nodal distance of the radiation can vary. At this stage, we do not understand the mechanism by which this occurs.

Further we have driven long discharge tubes at comparatively low power, such that the discharge decays exponentially from the drive point at the wave guide and does not occur along the full length of the tube. This is less satisfactory in terms of usage for instance in sterilising a liquid stream, where nodal variation is unlikely to be a problem but decay from one end of the tube to the other could allow part of the liquid stream to escape irradiation.

BRIEF DESCRIPTION OF THE DRAWINGS

To help understanding of the invention, a specific embodiment thereof will now be described by way of example and with reference to the accompanying drawings, in which:

FIG. 4 is a similar view of the lamp with the long discharge tube and wave guide;

FIG. 5 is a practical installation of the lamp in a water main;

FIG. 6 is a view of the lamp configured as a strip light;

DEETAILED DESCRIPTION OF THE PREFERRED EMBODIMENT

Figure 1:
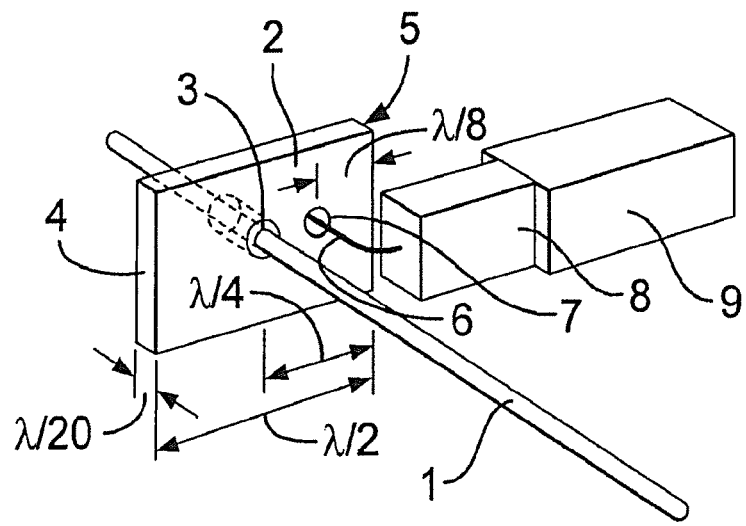
FIG. 1 is a perspective view of a lamp of the invention.

Referring to the drawings, FIG. 1 shows a discharge tube 1 of quartz, filled with a low pressure halogen/noble-gas mix, passes through a ½ λ wave guide 2 of alumina at an aperture 3¼ λ from one end 4, i.e. centrally. The wave guide is silver plated to establish resonant oscillation between its opposed ends 4,5. This mode of resonance is independent of the thickness of the wave guide, which can therefore be thin, say ¹⁄₂₀ λ. An antenna/probe 6 is provided in another aperture 7, driven via a matching circuit 8 from an amplifier 9. The matching circuit can be of the comb filter, bandpass type, as described in our International Application No PCT/GB2007/001935. The amplifier can be a solid state device. Alternatively, a magnetron can be used.

Typically the drive frequency is 2.4 GHz, at which frequency, λ in alumina with its dielectric constant of 10 is 100 mm and the wave guide at λ/2 is 50 mm long. The wave guide and antenna apertures are centred 12.5 mm from the respective ends of the wave guide and the wave guide is 5 mm thick.

Figure 2:
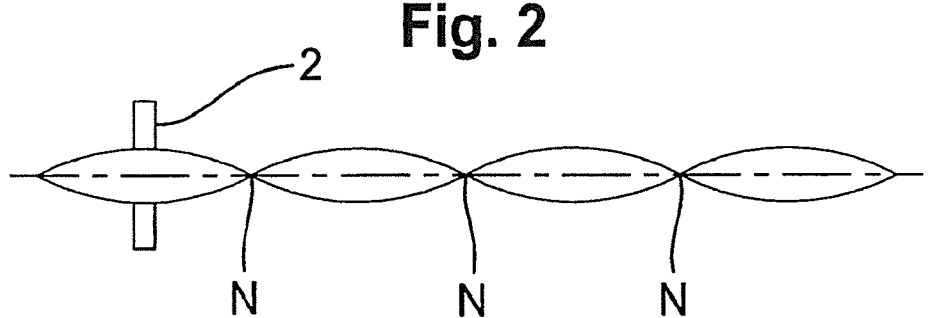
FIG. 2 is a diagrammatic side view of the lamp with a short discharge tube.

As shown in FIG. 2, with the wave guide close to one end, plasma discharge occurs in the short 200 mm tube with three standing wave nodes N along the length of the tube at 50 mm spacing. The wave guide is acting to couple microwave energy from resonance in the wave guide to surface waves in the discharge tube. We refer below to the wave guide as a "coupler". The dielectric constant of the tube is not 10 and it is believed to be coincidental that the nodes are at the same distance in the tube as the λ/2 length of the wave guide. The tube being of quartz, its dielectric constant is 3.78. Typically it is of 6 mm outside diameter, with a 1 mm wall thickness. We have used a fill pressure of 2 torr (2 mm Hg). At this pressure the light emitting plasma discharge occurs throughout the gas fill, whilst we believe that the energy dissipation from the microwave, surface-wave, electric field to the fill occurs close to the outside of the column of the gas fill, generating high energy electrons, which travel into the body of the fill, where they strike the gas particles and cause emission of light. We have noted that as the fill pressure is increased, there is a tendency for the emission, i.e. the plasma to be more concentrated along the axis of the gas fill. We do not expect to use a fill pressure above one atmosphere.

Figure 3:
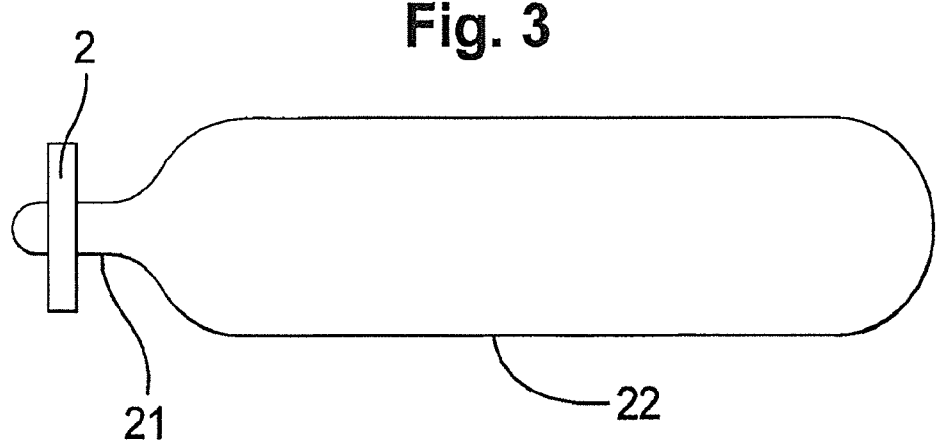
FIG. 3 is a similar view of the lamp with a long discharge tube.

Accordingly for increased light dissipation, we prefer to increase the tube diameter and retain the low fill pressure, typically below 10 torr. FIG. 3 shows a practical way in which this can be achieved with a 25 mm tube diameter, which is comparable with some of the wave guide dimensions and large in comparison with the aperture 3. (Making this too large would disturb the oscillation mode in the waveguide.) The tube shown there has a 10 mm neck 21 of 6 mm diameter and a 100 mm large diameter portion 22 of 25 mm outside diameter.

FIG. 4 shows a 600 mm long discharge tube with the coupler ¼ of its length along. For the strength of driving microwave signal, the plasma discharge occurs with nodes in its short portion, but no nodes in its longer portion, where the excited surface wave decays along its length, not least due to the ultra violet emission from the plasma. Thus there is not enough microwave radiation reaching the far end of the tube for reflection to establish a standing wave.

In FIG. 5 there is shown a practical installation of a lamp of the invention in a water main 101 for irradiation of the water W with UV light from the lamp for sterilisation of the water. At a bend 102 in the main, a glass tube 103 projects on the central axis of an upstream portion of main. The tube has a closed upstream end 104 is sealed by an O-ring 105 against leakage of water at a fitting 106 in the elbow. The fitting has a mouth 107, closed in use by a light-tight plate 108, which prevents escape of UV light. The lamp has its discharge tube 109 extending into the glass tube, with coupler 110 and drive circuitry 111 accommodated in the mouth. UV light from tube irradiates the water flowing in the main. It should be noted that in this embodiment, the discharge tube aperture 112 does not extend through the coupler 110 and the discharge tube extends on one side only of the coupler.

A lamp of the invention configured as a strip light is shown in FIG. 6. It comprises a central coupler 201, with a matching circuit and microwave source 202 in a ceiling housing 203. From each side of the housing and integrally moulded therewith extend downwardly open reflectors 204. These and the inside of the housing are metallised 205, for reflection and as part of Faraday cage, completed by a wire mesh 206 held by lips 207 of the reflectors. Extending laterally from the coupler 201 is the lamp's discharge tube 208 with equal portions in the two reflectors.

Figure 7:
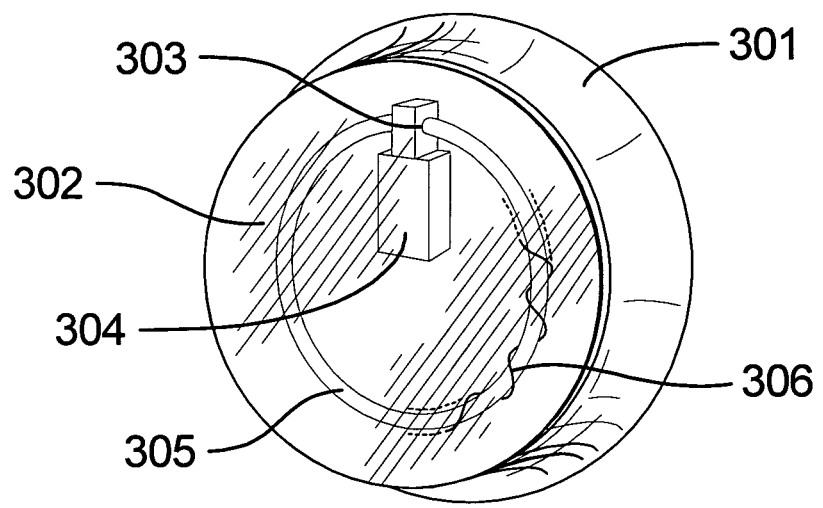
FIG. 7 is a view of the lamp in the form of a luminaire.

Another lamp is shown in FIG. 7, in the form of a luminaire having an wall housing 301 and a transparent cover 302. At an upper region of the housing, the lamp's coupler 303 extends radially with the matching circuit and microwave source 304 arranged centrally. The discharge tube 305 is annular, having no separately discernible ends, looping down within the housing around the source. A wire 306 is wound around the tube as a Faraday cage.

Figure 8:
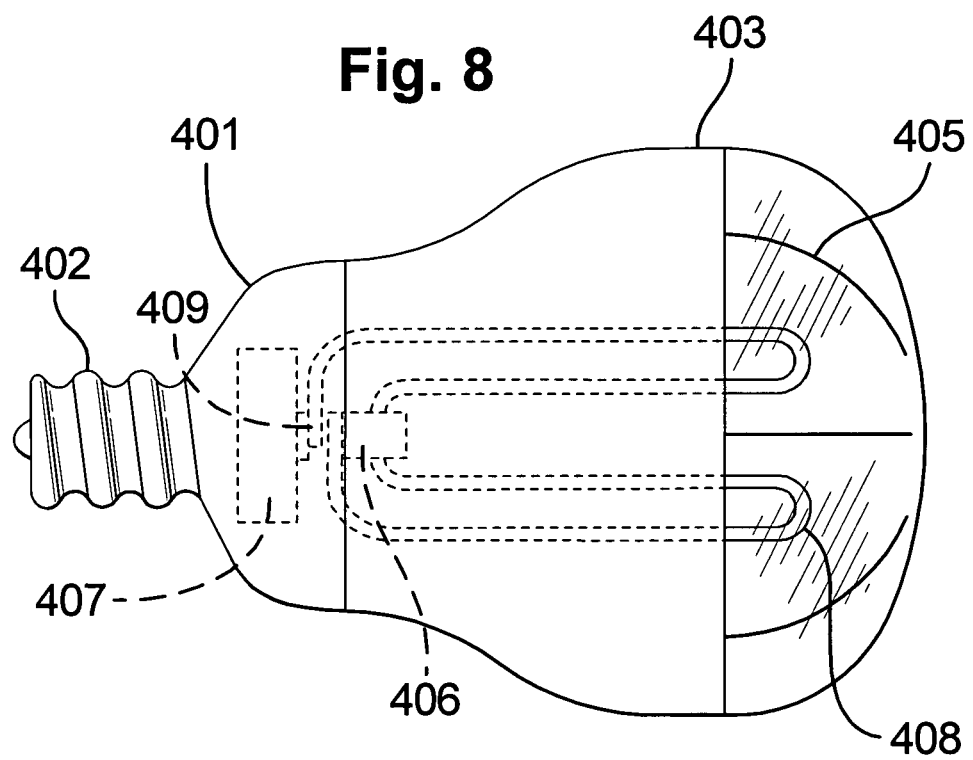
FIG. 8 is a view of the lamp as a filament bulb replacement.

A further lamp, as a filament bulb replacement, is shown in FIG. 8. It has a moulded housing 401, with a screw fitting 402. Forwards from the housing extends a transparent enclosure 403, which is metallised 404 to be reflective except at its forward end from which light radiates and which has a pattern of metallisation lines 405 to complete the Faraday cage here. A coupler 406 and a microwave source 407 are mounted in the housing. A discharge tube 408 passes through the coupler and is doubled back on itself to accommodate its length within the enclosure. The ends 409 of the tubes abut for mutual support alongside the coupler, but are not continuous internally and are merely physically connected to the outside of the coupler.

The invention is not intended to be restricted to the details of the above described embodiments. For instance, provided the fill used is not aggressive to borosilicate glass, it can be used in place of quartz for the discharge tubes. Further alternatives are polycrystalline alumina. Other materials are possible but unlikely on economic grounds, e.g. YAG and artificial sapphire. Where it is desired to use a large diameter discharge tube with a small diameter portion extending through the wave guide and to have the discharge tube extending on both sides of the wave guide, the tube can be waisted and the wave guide can be provided in two parts, closed around the waisted portion of the tube.

What is claimed is:

1. A lamp comprising:
   a microwave wave guide of solid dielectric material, the wave guide being a body having:

thickness between two opposite sides;
a discharge tube aperture extending into the body of the wave guide from one side; and
a transverse dimension between two opposite edges, which dimension is an integer and/or fractional multiple of a wavelength of microwave oscillation in the wave guide at a drive frequency between the edges, which edges are electrically grounded;
a drive probe received in the wave guide for exciting the microwave oscillation; and
a discharge tube containing a material excitable by the microwave oscillation to produce a light emitting plasma in the discharge tube, the discharge tube:
having a length greater than twice the thickness of the wave guide;
extending from the wave guide on at least one side thereof and into the aperture in the wave guide for coupling the microwave oscillation from the wave guide to the discharge tube; and
containing a material excitable by the microwave oscillation to produce a light emitting plasma in the discharge tube wherein the wave guide is thin with respect to the wavelength of the microwave oscillation.

2. A lamp as claimed in claim 1, wherein the discharge tube extends from the wave guide on both sides thereof.

3. A lamp as claimed in claim 2, wherein the lamp is arranged to radiate light from portions of the discharge tube extending on both sides of the wave guide.

4. A lamp as claimed in claim 1, wherein the discharge tube is curved with a central axis of the discharge tube lying substantially in a plane and the wave guide extends substantially at right angles to the plane.

5. A lamp as claimed in claim 4, wherein two ends of the discharge tube meet each other without connection of the interior of the tube at their meeting point.

6. A lamp as claimed in claim 4, wherein two ends of the discharge tube meet each other and the interior of the tube is continuous at their meeting point.

7. A lamp as claimed in claim 1, wherein the discharge tube is curved is three dimensions with the wave guide being arranged at one end or side of a shape defined by the central axis of the discharge tube.

8. A lamp as claimed in claim 1, wherein the lamp has a length of the order of or greater than ten times the thickness of the wave guide.

9. A lamp as claimed in claim 1, wherein the discharge tube has a length which is a multiple of the wave length of standing waves in the discharge tube at the microwave drive frequency.

10. A lamp as claimed in claim 1, wherein the solid dielectric material is chosen from the group comprising: alumina, quartz, plastics materials including polytetrafluoroethylene, barium tetratitinate and titanium oxide.

11. A lamp as claimed in claim 1, wherein the discharge tube is of quartz, glass or polycrystalline alumina.

12. A lamp as claimed in claim 1, wherein the excitable material is of a type which radiates ultra violet light from a plasma excited in it by microwave energy.

13. A lamp as claimed in claim 12, wherein the excitable material is a rare gas and/or a free halogen gas, possibly including mercury.

14. A lamp as claimed in claim 12, wherein the discharge tube has a lining of fluorescent material for generation of visible light from the ultraviolet light.

15. A lamp as claimed in claim 1, wherein the excitable material is of a type which radiates visible light from a plasma excited in it by microwave energy.

16. A lamp as claimed in as claimed in claim 15, wherein the excitable material is of rare gas with a metal halide, a metal oxyhalide or a metal hydride.

17. A lamp as claimed in as claimed in claim 1, wherein the discharge tube is enclosed in a Faraday cage for enclosure of microwave radiation.

18. A lamp as claimed in claim 17, wherein the Faraday cage comprises a visible light reflector to one side of the tube and a member which is transmissive of visible light on an opposite side of the tube.

19. A lamp as claimed in claim 1, wherein the discharge tube is waisted or necked at the wave guide receptacle.

20. A lamp as claimed in claim 19, wherein the necking is at an end of the discharge tube.

21. A lamp as claimed in claim 19, wherein the waisting is remote from end of the discharge tube, the wave guide being provided in two parts secured around the waisting of the tube.

22. A lamp as claimed in claim 1, wherein the quiescent vapor pressure of the excitable material in the discharge tube is less than one atmosphere.

23. A lamp as claimed in claim 22, wherein the quiescent vapor pressure is 10 ton or less.

24. A lamp as claimed in claim 1, wherein the integer is one or two, whereby fundamental resonance is established in the wave guide during use of the lamp.

25. A lamp as claimed in claim 1, wherein the two opposite edges are plane, parallel edges.

26. A lamp as claimed in claim 1, wherein the two opposite edges are oppositely and convexly curved edges.

27. A lamp as claimed in claim 1, wherein the arrangement of the opposite edges, the probe and the discharge tube aperture is such that oscillation in the wave guide coupled to the discharge tube is independent of the thickness of the wave guide.

28. A lamp as claimed in claim 1, including a source of microwave energy and a matching circuit connected between the source and the wave guide.

29. A lamp as claimed in claim 1, wherein the thickness of the wave guide is of the order of one twentieth of the wavelength of the microwave oscillation.

30. A lamp as claimed in claim 1, wherein the discharge bulb has a length of the order of ten times the thickness of the wave guide or greater.

31. A lamp as claimed in claim 29, wherein the discharge bulb has a length of the order of ten times the thickness of the wave guide or greater.

* * * * *